United States Patent

[11] 3,622,427

[72] Inventor Andrew J. Kelly
West Roxbury, Mass.
[21] Appl. No. 32,587
[22] Filed Apr. 28, 1970
[45] Patented Nov. 23, 1971
[73] Assignee W. R. Grace & Co.
Cambridge, Mass.

[54] PAD FOR TESTING THE SEAL OF A CAN
3 Claims, 4 Drawing Figs.
[52] U.S. Cl. .................................................. 161/42,
73/49.2, 73/49.8, 161/109, 161/116, 161/162,
161/164, 260/41.5 A, 260/92.3
[51] Int. Cl. ........................................................ G01m 3/02,
B32b 3/00, B32b 15/06
[50] Field of Search ........................................... 161/42,
109, 217, 218, 116, 162, 164; 73/49.8, 49.2, 40;
260/92.3, 37 R, 41 A, 41.5 A

[56] References Cited
UNITED STATES PATENTS
| | | | |
|---|---|---|---|
| 1,606,486 | 11/1926 | Stevens | 73/49.2 |
| 2,646,677 | 7/1953 | Kubaugh | 73/49.2 |
| 2,696,106 | 12/1954 | Schneider | 73/49.2 |
| 3,213,673 | 10/1965 | Schulhoff | 73/49.2 |
| 3,325,429 | 6/1967 | Harris | 260/41.5 A X |

OTHER REFERENCES

" Plasticizers and Modifiers For use with Natural and Synthetic Elastomers," The Resinous Products & Chemical Co., 1942, pages 1– 8.

Wolf et al., " Compounding of Neoprene with Fine–Particle Silica," Rubber Age, 6/1950, pages 317– 322.

Detenber, " Improved Processibility of Silica Loaded Neoprene," Elastomer Chemical Dept., E. I. du Pont de Nemours & Co., BL-369, 10/1960, pages 1– 4.

Primary Examiner—John T. Goolkasian
Assistant Examiner—Joseph C. Gil
Attorneys—Metro Kalimon, William L. Baker and C. E. Parker ABSTRACT: Sealing pads adapted to seal the open ends of cans while being tested on can body testing machines are formed of polychloroprene (neoprene), colloidal silica, and a plasticizer for the polychloroprene. Pads giving about 460,000 ends before failure result if the proportions of silica lie between 7 and 35 parts per hundred calculated on the weight of the polychloroprene, and if at the same time the weight of the plasticizer calculated on the same basis lies between 30 and 53 parts.

PATENTED NOV 23 1971 3,622,427

INVENTOR
ANDREW J. KELLY

PAD FOR TESTING THE SEAL OF A CAN

This invention relates to sealing pads for can testing machines. In the manufacture of metallic cans, a flat sheet of tinplate is stamped out to form a body blank. The blanks are formed into can bodies. The body hooks are interlocked, the side seam is "bumped" and the side seam is flooded with solder. Subsequently, the can ends are flanged. The can body then goes to the end seamer where the can end is applied to the open-ended body in an operation known as "double seaming."

All "sanitary" cans are sent to the food packer, minus tops. These are applied at the food packing plant after the food has been placed in the cans.

It follows that an open-ended can having an out-turned flange at its top margin is a finished product so far as the can maker goes. Since the can must be hermetically tight in order to preserve the foodstuffs after they have been sterilized in the can, what the can maker sends to the food packer must be hermetically tight itself. Can lines run at tremendous speeds. Some lines produce 350 cans a minute. Obviously, any involved inspection procedures are out of the question.

Nevertheless, a perfect can is a requisite for food safety and inspection of the open top cans is conducted as follows: the cans move to a tester, some of which are quite large wheel-like machines, where the open-ended can is clamped between a pressure member and a rubber sealing pad. The pad has a central orifice so that the tightness of the can may be tested either by applying pressure to the can through the orifice or by sucking a vacuum through the same orifice.

If, while the can still remains clamped to the testing machine, the pressure either rises in a vacuum tester or falls in a pressure tester, an automatic device releases the can and ejects it from the line of cans which have successfully passed the test.

Because the raw edge of metal at the end of the can comes in contact with the sealing pad, it frequently happens that any burr or nick will cut or pit the sealing pad. In that case, the automatic discard devices eject a can in which no defects exist, for the testing machine cannot discriminate between a leak in the can body itself and a leak which is due to a cut in the sealing pad.

The pads that presently are in use are made of a soft neoprene compound although other polymers can be used. The average performance in the can testing machines is about 165,000 cans before the pad becomes so badly cut that it must be replaced. When it is remembered that some 28 billion cans are manufactured in the United States each year, it is easy to see that any sealing pad which has a longer life on a testing machine than do the pads presently in service is responsible for substantial cost savings, not only for the pad itself but for downtime on a can line.

It is the object of this invention to maintain the same sealing efficiency presently exhibited by the soft pads used in the can-making industry, but to produce a cut-resistant pad which, although sealing as effectively as pads presently in service, had materially increased service life.

The improved pad has a Shore A durometer hardness of 30 or lower, but in service is capable of testing more than 460,000 cans before cuts and nicks end its usefulness.

Figure 2:
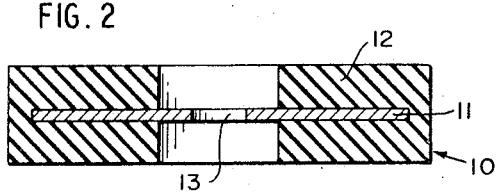
FIG. 2 shows the pad in section.

Referring to FIG. 2, a common type of pad 10 comprises a pierced steel disc 11 which is approximately one-eighth of an inch thick, completely buried in a round body 12 of flexible resilient material such as neoprene. A commonly used pad diameter is 5 inches. Its thickness is 1¼ inch. The aperture 13 which gives communication between the interior of the can body and the air or vacuum lines is five-eighths of an inch in diameter. The can body is pressed against the body 12 while it is held in a recess in the can testing machine.

Figure 4:
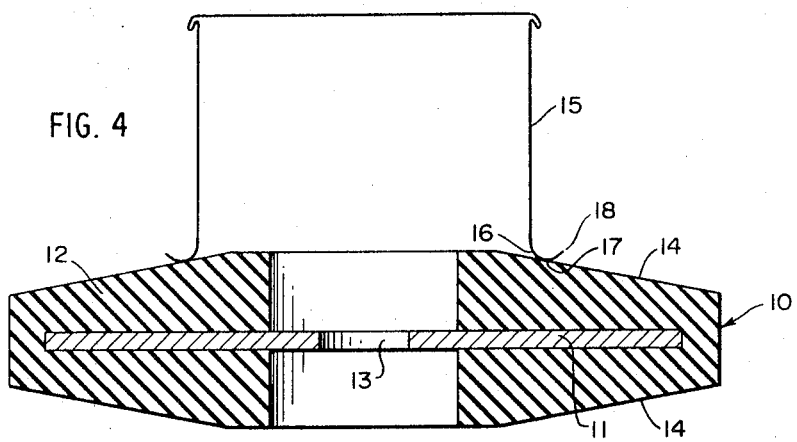
FIG. 4 shows a cross-sectional view of a variation of of the pad.

The pad shown in FIG. 4 has a configuration which has been found to have added testing life. In this arrangement, the surface 14 of the body portion 12 tapers outwardly commencing a distance from the perimeter of the aperture 13 of the disc 11 and terminates at the circumferential edge of the body. The overall slope of the tapered section ranges between about 5 and 10 degrees. When a can 15 is being tested, the flange 16 of the can initially contacts the pad on the underside portion 17 of the flange which has a smooth surface rather than contact being made first by the sharp edge 18. Consequently, the tapered body portion of the pad provides a seat for the smooth portion of the flange and thus prevents the sharp edge 18 from cutting into the surface of the pad.

The opposed surfaces of the pad which contact the can during testing are mirror images of each other to permit reversibility. When the testing life of one surface has been exhausted, the pad is turned over for additional testing, thus doubling the life of the pad.

It has been found that soft elastomeric compounds in which the Shore A durometer hardness is 30 or less seat better and throw out far fewer "false rejects." False rejects are cans which are perfect but which are thrown out because the seal at the moment of testing is cut or nicked, causing pressure deviations which have actuated the ejection apparatus.

Extensive investigation has resulted in the discovery that if the filler in a neoprene compound has an average particle size of 0.01 to 0.05 micron and if the proportions of the plasticizer is very carefully chosen, the wearing qualities of the can testing pads are approximately doubled. The resistance to cutting is exhibited by the use of colloidal size silica as the filler. Pads compounded with the same amount and of kinds of ingredients with the sole substitution of carbon black of equivalent particle size, and surface area, did not resist cutting well.

Colloidal size silica is commercially available. That used in the examples and tests reported herein was Hi-Sil 233 which contains approximately 87 percent of silicon dioxide. It has a particle size of 0.022 micron and a surface area of 120–160 $m.^2/g$.

It has been found that the plasticizer need not be of a specific type. Illustrative plasticizers include dialkyl phthalate, e.g., dibutyl and dioctyl phthalate; dialkyl esters of alkane dicarboxylic acids, e.g., dioctyl adipate dibutyl sebacate; alkylene glycol derivatives, e.g., triethylene glycol di(2-ethyl hexoate), dipropylene glycol dibenzoate, and ethylene glycol monobutyl ether oleate; compounds derived from 18-carbon monocarboxylic fatty acids, such as lower alkyl oleates, e.g., butyl oleate; naphthenic oils; or any of the other relatively nonvolatile plasticizing materials used as processing aids for neoprene. Importantly, the proportions of silica filler, polychloroprene and plasticizer lie in a critical range, otherwise Shore A durometer hardness of 30 or less will not be produced, and the composition either will become too hard or have too little abrasion resistance when it is cured.

Figure 1:
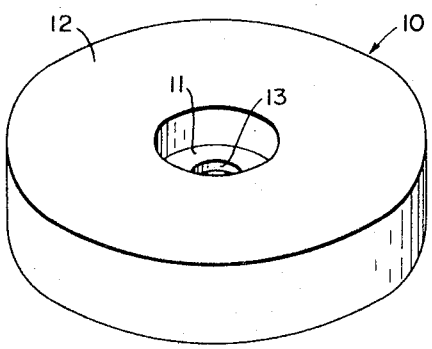
FIG. 1 illustrates in perspective elevation the usual sealing pad.
Figure 3:
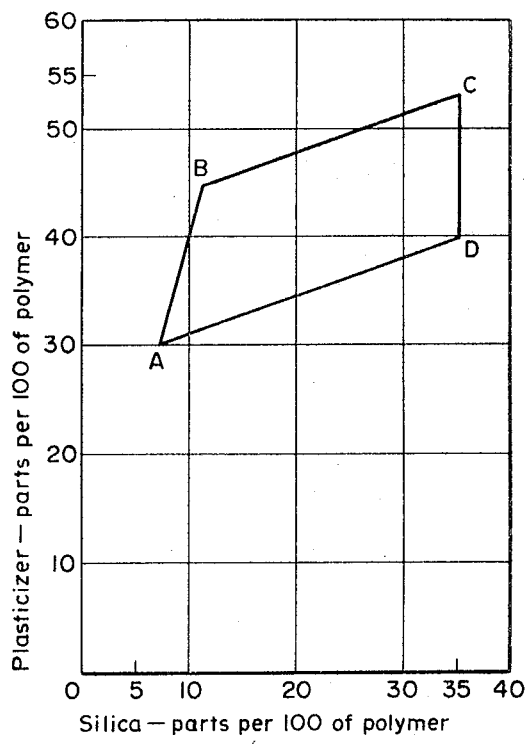
FIG. 3 is a graph showing operative proportions.

In FIG. 3 the proportions of fine silica and plasticizer each expressed as parts per hundred calculated on the weight of the polychloroprene appears on the graph. The area enclosed within the points, A, B, C and D, shows the operating range. Proportions lying outside of the area produce pads which, at the worst are inoperative, and at the best give an unacceptable performance when compared with pads made in accordance with this invention.

Acceptable compositions having low durometer hardness and good abrasion resistance are shown on table I.

In testing abrasion resistance, specimens of each compound were cured in a mold which produced slabs of 6×2×1¼ inches. Molding pressure was 500 p.s.i. The samples were cured at 306° F. for 38 minutes.

The slabs were fastened in a holding block beneath a movable rod the point of which could be drawn back and forth across the surface of a slab. In the following test, the point and its load had a combined weight of 210 g. Tracking of the point was adjusted so that the point always traveled in the same path. The combined width and depth of the cut which was made by 500 strokes of the apparatus was measured in units of 0.005 of an inch, which is a sum related to the abrasion resistance of the material to the action of the moving point.

Dimensions of the point were as follows: diameter one-fourth of an inch, curvilinear taper to the point seven-sixteenths of an inch. The abrasion resistance of acceptable compounds when measured by the above test appears in table I.

In contrast, the erratic performance when the proportions of silica and plasticizer lie outside the recommended range is shown in table II:

TABLE I (Plasticizer and Silica Levels Within Critical Region)

|  | A | B | C | D | E | F | G | H | I | J |
|---|---|---|---|---|---|---|---|---|---|---|
| Neoprene WRT | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 |
| Magnesium oxide | 4 | 4 | 4 | 4 | 4 | 4 | 4 | 4 | 4 | 4 |
| Phenyl beta-naphthylamine | 2 | 2 | 2 | 2 | 2 | 2 | 2 | 2 | 2 | 2 |
| Plasticizer [1] | 30 | 40 | 41 | 45 | 45 | 47 | 35 | 40 | 45 | 53 |
| 2-mercaptoimidazoline | .4 | .4 | .4 | .4 | .4 | .4 | .4 | .4 | .4 | .4 |
| Neophax A [2] | 13 | 3 | 3 | 3 | 0 | 3 | 3 | 22 | 3 | 3 |
| Silica (Hisil 233) | 7 | 35 | 14 | 14 | 21 | 30 | 21 | 21 | 11 | 35 |
| Durometer (Shore A) | 27 | 30 | 28 | 21 | 23 | 24 | 30 | 29 | 21 | 26 |
| Abrasion rating | 10 | 10 | 8 | 8 | 10 | 9 | 9 | 10 | 10 | 10 |

[1] 50/50 blend of butyl oleate and Circosol 2XH. (Circosol 2XH is a petroleum oil composed of 22% of aromatic carbon atoms, 40% naphthenic carbon atoms and 38% paraffinic carbon atoms; a molecular weight of 390; aniline point 171° F.; specific gravity at 60° F., 0.949; and a viscosity of 85, SUS at 210° F.
[2] A vulcanized vegetable oil—Factice.

TABLE II (Plasticizer and/or Silica Level Outside Critical Region)

|  | M | N | O | P | Q | R | S | T | U |
|---|---|---|---|---|---|---|---|---|---|
| Neoprene WRT | 100 | 100 | 100 | 100 | 100 | 100 | 100 | 100 | 100 |
| Zinc oxide | 5 | 5 | 5 | 5 | 5 | 5 | 5 | 5 | 5 |
| Magnesium oxide | 4 | 4 | 4 | 4 | 4 | 4 | 4 | 4 | 4 |
| Phenyl beta-naphthylamine | 2 | 2 | 2 | 2 | 2 | 2 | 2 | 2 | 2 |
| Plasticizer [1] | 24 | 22 | 48 | 30 | 29 | 33 | 30 | 36 | 40 |
| 2-mercaptoimidazoline | 1.6 | .4 | .4 | .4 | .4 | .4 | .4 | .4 | .4 |
| Neophax A | 25 | 17 | 25 | 13 | 3 | 31 | 10 | 6 | 3 |
| Hisil 233 | 28 | 7 | 14 | 14 | 7 | 21 | 0 | 7 | 50 |
| Durometer | 39 | 34 | 23 | 31 | 31 | 36 | 30 | 24 | 30 |
| Abrasion rating | 8 | 10 | 12 | 5 | 10 | 8 | 11 | 11 | 13 |

[1] 50/50 blend of butyl oleate and Circosol 2XH.

By this invention, can testing machines need to be shut down for change in pads only half as frequently as when conventional compounds are used. The value of the invention is evident. Not only are fewer pads required, but the reduction in downtime on a line that tests more than 300 cans a minute is a significant advance.

I claim:

1. A sealing pad suitable for use in can body testing machines comprising:
    a. a rigid support disc having a central aperture;
    b. a resilient body portion composed of a cured polychloroprene compound encasing said disc;
    c. said compound comprising per 100 parts by weight of polychloroprene an amount of plasticizer and colloidal silica falling within the area ABCD of FIG. 3, and
    d. said pad having a Shore A durometer hardness lying between 21 and 30 and a cut and abrasion resistance not in excess of 10.

2. A pad according to claim 1 wherein the particle size of the silica ranges between 0.01 and 0.05 micron.

3. A pad according to claim 1 wherein the surface of the body portion tapers outwardly between 5 and 10° commencing a distance from the perimeter of the disc aperture to the circumferential edge of the body portion.

* * * * *